United States Patent [19]

Kochan

[11] 4,176,590
[45] Dec. 4, 1979

[54] DOUGHNUT FRYING APPARATUS

[75] Inventor: Kenneth Kochan, Burlington, Vt.

[73] Assignee: Automated Donut Systems, Inc., Winchester, Mass.

[21] Appl. No.: 931,387

[22] Filed: Aug. 7, 1978

[51] Int. Cl.² ............................................. A47J 37/12
[52] U.S. Cl. ........................................ 99/405; 99/409
[58] Field of Search ................. 99/403, 404, 405, 406, 99/407, 409, 442, 443 C

[56] References Cited

U.S. PATENT DOCUMENTS

| 1,834,182 | 12/1931 | Roehl | 99/405 |
| 1,904,370 | 4/1933 | Hunter | 99/405 |
| 1,965,241 | 7/1934 | Hunter | 99/405 |
| 2,286,013 | 6/1942 | Roth | 99/405 |
| 3,283,695 | 11/1966 | Belshaw | 99/409 X |
| 3,882,768 | 5/1975 | Troisi | 99/404 X |

Primary Examiner—Billy J. Wilhite

[57] ABSTRACT

Doughnut frying apparatus has a conveyor extending lengthwise of a hot oil tank and provided with flights which provide spaces, each space accommodating a transverse series of floating doughnuts. Midway of their travel, the doughnuts are turned over by a device having a transverse shaft provided with diametrically opposed receivers. Each receiver has leading vane and trailing transverse vane with the two vanes defining an acute angle. The device is turned by the conveyor with each receiver having a first position in which the leading vane is above and the trailing vane is below the conveyor space next to the shaft on the pick-up side thereof and a second position in which the trailing vane is above and the leading vane below the conveyor space next to the shaft on the release side thereof, the leading vane having caught the doughnuts picked up by the trailing vane as they toppled forwardly therefrom and lowered the turned over doughnuts into the hot fat.

3 Claims, 6 Drawing Figures

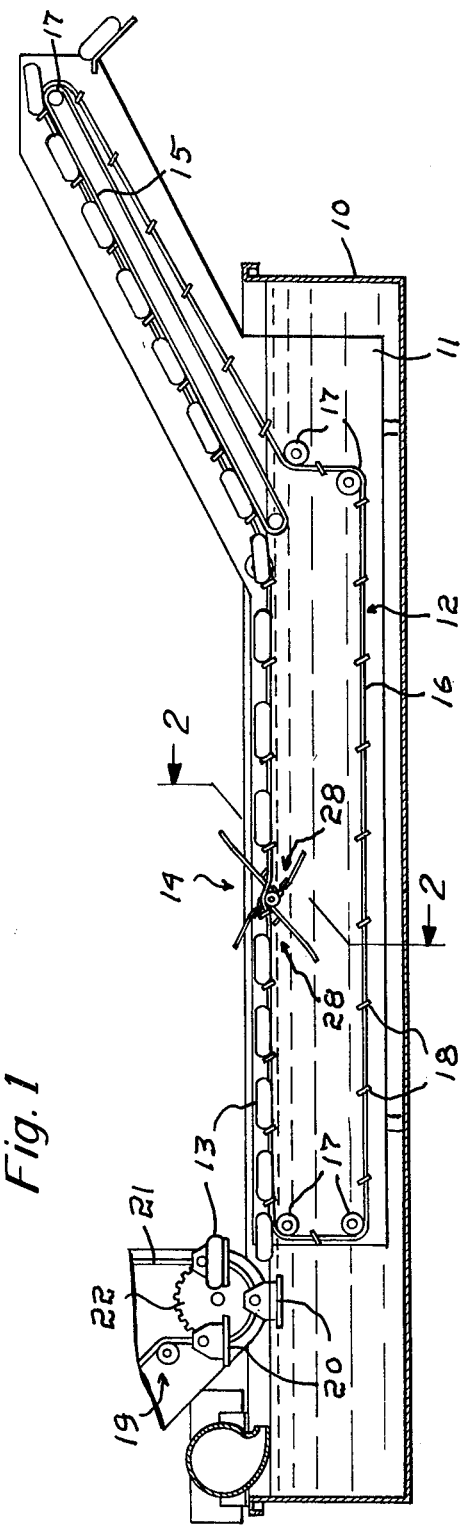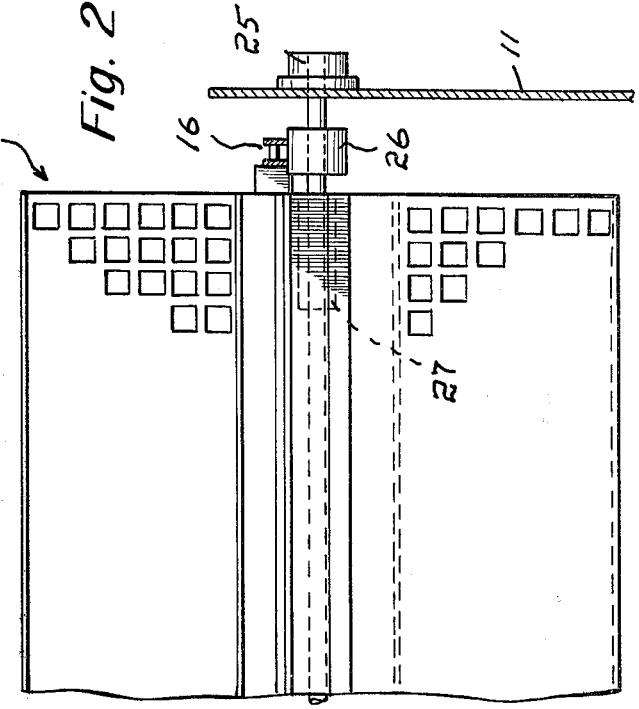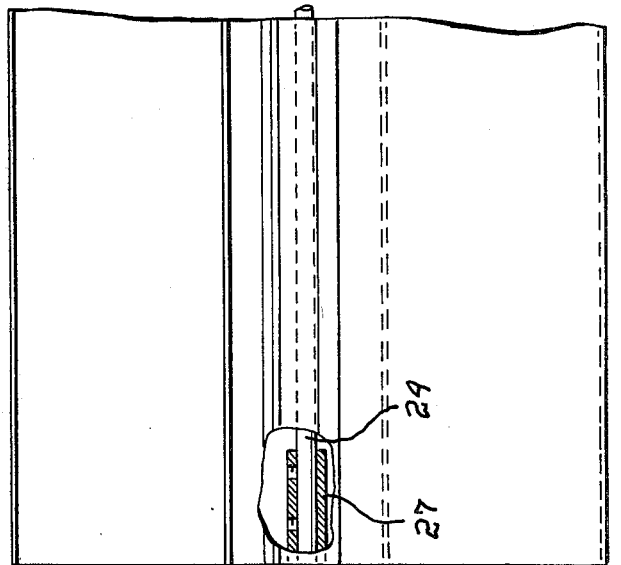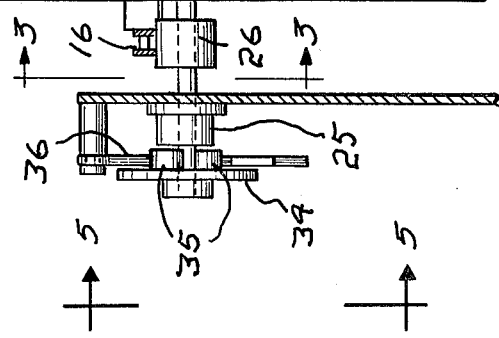

DOUGHNUT FRYING APPARATUS

BACKGROUND REFERENCES

U.S. Pat. No. 2,286,013
U.S. Pat. No. 3,283,695

BACKGROUND OF THE INVENTION

When doughnuts are being fried on a commercial basis, their positive advance from one end of the tank to the other is assured by a conveyor. The advancing doughnuts are turned over midway of their travel through the frying tank by a conveyor operated device having a transverse shaft and a plurality of uniformly spaced vanes that pick up doughnuts in a space next to the shaft on the infeed side thereof and, as the shaft continues to turn, raises them until they topple forwardly into the hot fat in the space adjacent the shaft on the other side thereof.

While most of the time, the operation of the device results in the doughnuts being turned over, the fact that failures do occur make it necessary for the frying operation to be monitored.

In the patent to Roth, U.S. Pat. No. 2,286,013 the device had four equally spaced vanes and in the patent to Belshaw et al U.S. Pat. No. 3,283,695, there were two diametrically opposed vanes, the devices of both patents, while subject to the occasional failures above referred-to, also resulted in the doughnuts being dropped into the hot fat. Turnover devices are sometimes called "flippers" and it will be appreciated that the action of the turning devices becomes less satisfactory as the rate of conveyor travel is increased as when increased production is wanted.

THE PRESENT INVENTION

The general objective of the present invention is to provide turning devices for doughnuts that are reliable in operation and effect the return of the inverted doughnuts into the hot fat in a more advantageous manner.

In accordance with the invention, this general objective is attained by providing that a turnover device has diametrically opposed doughnut receivers carried by a transverse shaft. Each receiver includes a leading vane and a trailing vane with the two vanes defining an acute angle. The device is turned by the conveyor by which the positive advance of a transverse series of doughnuts from one end of the frying tank to the other is assured. In a first operative position of a receiver, the leading vane is above and the trailing vane below the transverse space between two conveyor flights that is next to the shaft on the infeed side thereof and as the shaft turns, any doughnuts in that space are lifted from the hot fat until they topple forwardly then to be caught by the leading vane, other side up. The doughnuts are then lowered into the hot fat in the next forward conveyor space so that they may float free therefrom and in the thus established second receiver position, the trailing vane is above the last named conveyor space.

Other objectives of the invention will be apparent from the accompanying description of the preferred embodiment shown in the drawings and from the appended claims.

BRIEF DESCRIPTION OF THE DRAWINGS

Preferred embodiments of the invention are illustrated by the accompanying drawings of which:

FIG. 1 is a somewhat schematic vertical section taken lengthwise of doughnut frying apparatus;

FIG. 2 is a section, on an increase in scale, taken approximately along the indicated line 2—2 of FIG. 1;

THE PREFERRED EMBODIMENTS OF THE INVENTION

Figure 3:
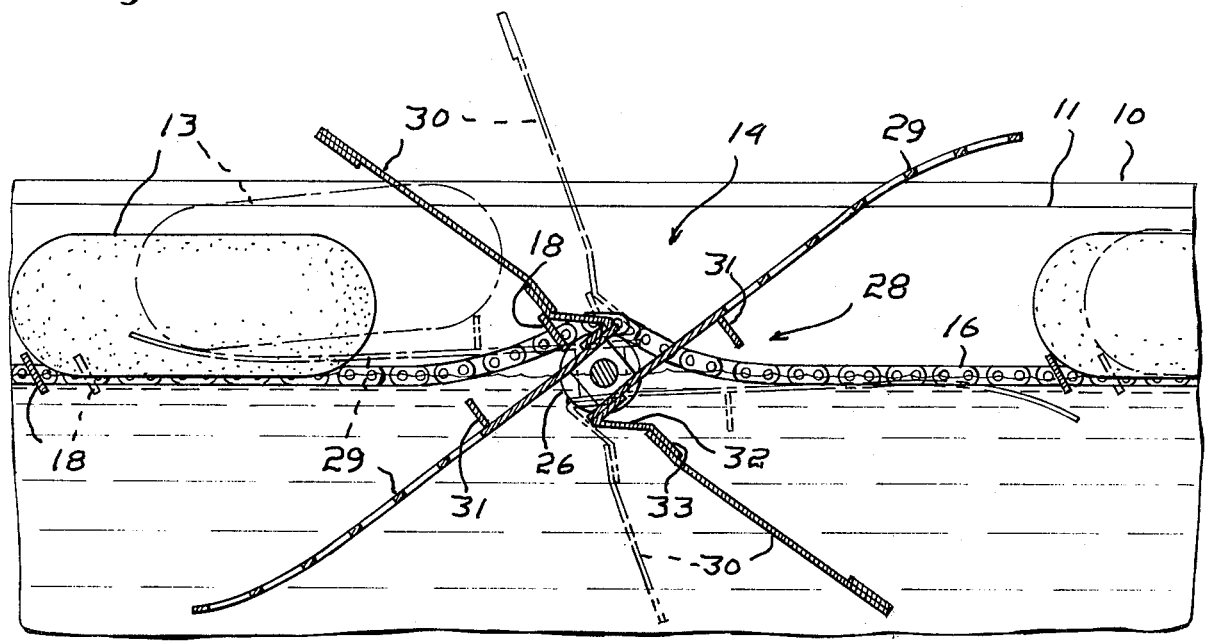
FIG. 3 is a section taken approximately along the indicated line 3—3 of FIG. 2 with one of the receivers of the doughnut turning device in the front or pick-up position and the other receiver in its second position.

In FIG. 1, the frying apparatus is shown as a hot oil tank 10 in which there is a removable support 11 for a conveyor, generally indicated at 12, operable to ensure the travel of doughnuts 13 from the rear end of the tank 10 to the other end thereof and to operate a device, generally indicated at 14 to turn the doughnuts over midway of their travel. The conveyor 12 is also used to carry the doughnuts 13 along an upwardly and forwardly inclined drain conveyor 15 from which the doughnuts are discharged for further processing.

The conveyor 12 includes a pair of chains 16 trained over sprockets 17 and interconnected by a series of uniformly transverse flights 18 spaced apart to provide a series of spaces, each dimensioned to receive a transverse series of doughnuts 13 with the upper course of the conveyor in a position so that each flight 18 may engage doughnuts forwardly thereof and ensure their advance.

Adjacent the rear end of the tank 10, see FIG. 1, there is a conveyor, generally indicated at 19 and provided with a series of uniformly spaced trays 20 pivotally supported by the conveyor chains 21. Each tray is dimensioned to support a transverse series of uncooked doughnuts 13 and the conveyor chains 21 are trained about sprockets 22 so disposed that each tray enters the hot oil with the doughnut normally floating free to the surface of the hot oil. Means such as a blower 23 ensure the movement of the floating doughnuts into a position in which they will be confined in the space between two flights 18 of the upper course of the conveyor 12.

The apparatus, as above described, is or may be conventional, see, for example, U.S. Pat. No. 3,882,768, except for the device 14 and accordingly the conveyor drive and other details are omitted that are disclosed in said patent. The device 14 includes a shaft 24 extending transversely of the support 11 and supported by bearings 25 in the walls thereof and between said walls provided with spaced guide rolls 26 over which the conveyor chains 16 extend. Collars 27 that are square in section are anchored to the shaft 24 between the rolls 26. The ends of two diametrically opposed doughnut receivers, generally indicated at 28 are secured to opposite sides of the collars 27.

Figure 4:
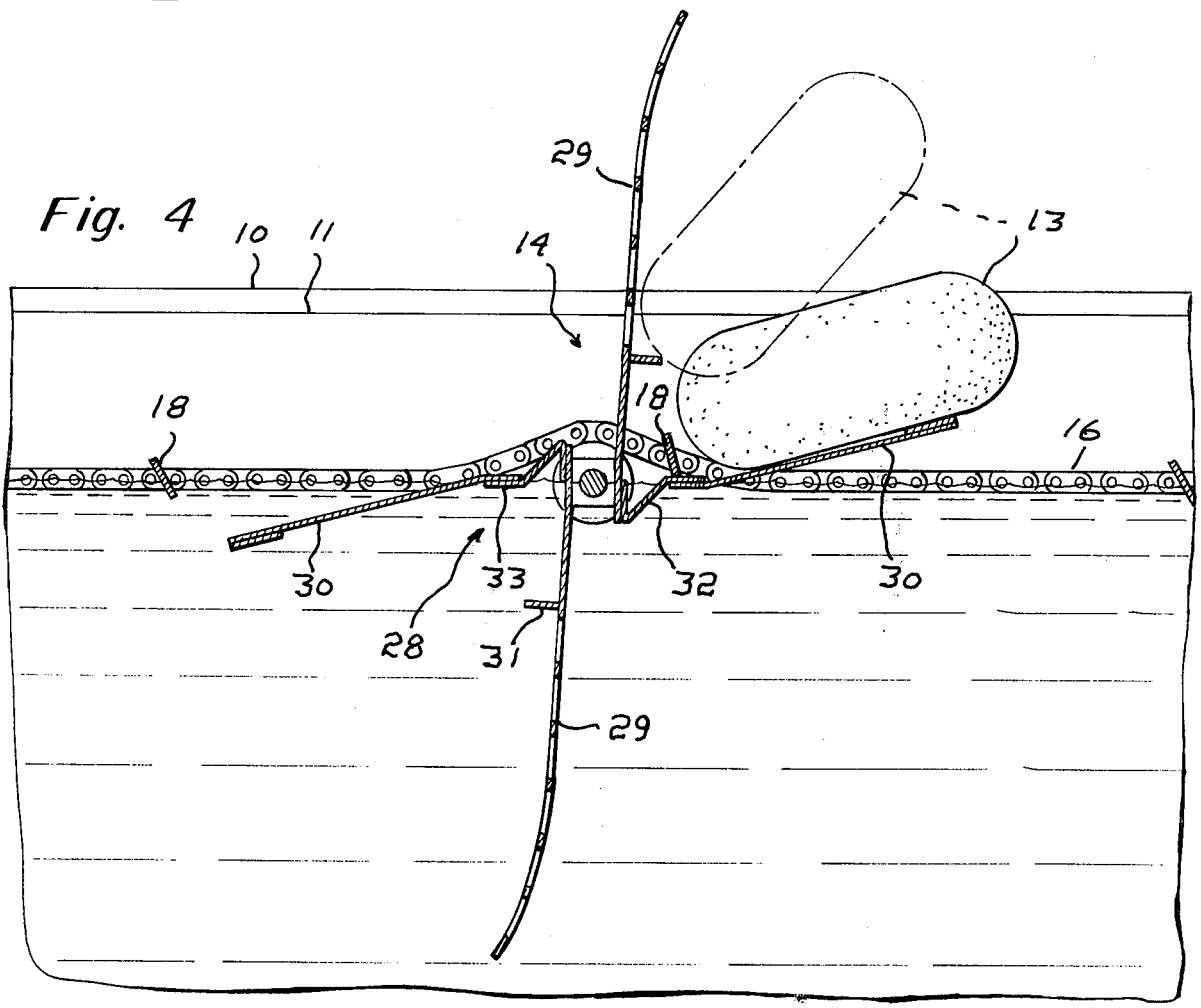
FIG. 4 is a like section but illustrating the toppling forward of a lifted doughnut turning onto the leading vane of the receiver.

Each receiver 28, best seen in FIGS. 3 and 4, includes a trailing vane 29 and a leading vane 30, both vanes of a length and width to enable them to pass freely between the spaces established by each two flights 18 and the chains of the conveyor 14. The vanes 30 are shorter than the vanes 29 and the vanes 29 have their free ends curved forwardly with respect to the direction in which the shaft 24 turns. The vanes 29 are perforated and each includes a stop 31 adjacent its inner end.

The vanes of each receiver are disposed at an acute angle and are interconnected by a transverse member 32 that is V-shaped in cross section with one side attached to a vane 29 and the other side terminating in an outwardly disposed flange 33 to which a vane 30 is secured, the vane 30 bent towards the trailing vane 29 to establish the wanted angular relationship of the receiver vanes. The angular relation between the vane of each receiver must, of course, be such as to enable the thickest product to be fried to be accommodated.

As will be apparent from FIGS. 3 and 4, each member 32 is engageable by a flight 18 of the conveyor 12 and as the conveyor chains 16 pass over the shaft rolls 26, the shaft 24 is turned with the receiver 28 on the infeed side of the device 14 moving upwardly and forwardly from a first position in which the trailing vane 29 is below and the leading vane 30 above the upper course of the conveyor 12 and the space between two flights 18 at the infeed side of its shaft 20, the forward one of which is the one causing the shaft 23 to turn.

As will be apparent from FIG. 3, as the shaft 24 is thus caused to turn, the receivers 28 are turned from their solid to their broken line positions with the trailing vane 29 of the rising receiver lifting doughnuts 13 from the space next to the shaft 24. As the shaft 24 continues to turn, the trailing vane 29 reaches a position, see FIG. 4, in which doughnuts 13 carried thereby topple forwardly from their broken line position to their solid line position in which they are caught by the leading vane 30 and lowered into the hot fat in the next forward conveyor space with the leading vane 30 of the receiver advanced in a position to pass upwardly through the now empty conveyor space on the infeed side of the device 14.

Figure 5:
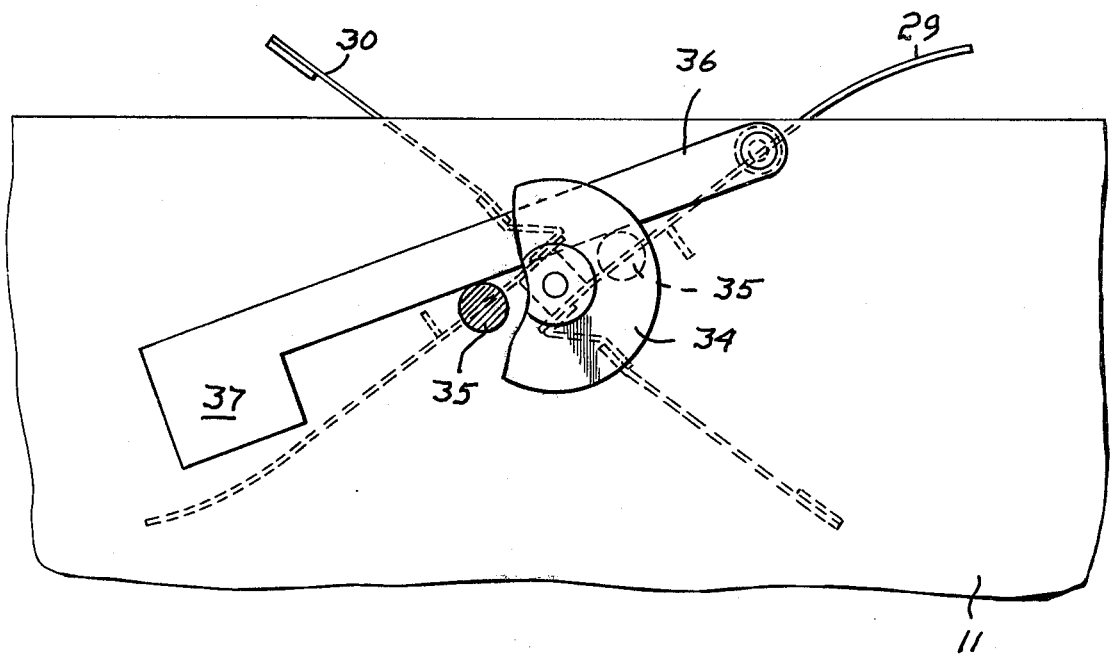
FIG. 5 is a section taken approximately along the indicated line 5—5 of FIG. 2 showing the means by which the turning is completed.

As the device 14 is turned only by the engagement of a flight 18 of the conveyor 12 with a receiver member 32, means are provided to ensure that each receiver 28 is in its first position at the proper time. Such means, see FIGS. 2 and 5, have been used for some time in doughnut frying apparatus, see, for example U.S. Pat. No. 2,286,013, and consist of a disc 34 mounted on one end of the receiver shaft 24 outside the support 11. The disc 34 has diametrically spaced pins 35. An arm 36, pivotally connected at one end to the outside of the support 11, has a weight 37 at its other end and is in engagement with both pins when a receiver 28 is in a first position. As the shaft 24 turns, the arm 36 is raised by a pin 35 until it may again drop into engagement with that and the other pin, the weight of the arm then ensuring proper positioning of the receivers 28.

Figure 6:
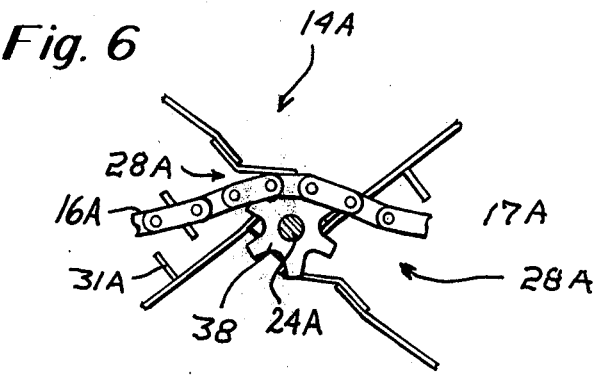
FIG. 6 is a section corresponding to FIG. 5 but illustrating another embodiment of the invention wherein the turning is effected by a chain drive.

In the embodiment of the invention illustrated by FIG. 6, the conveyor chains 16A are used to turn the shaft 24A which is provided with sprockets 38 for that purpose. While in this embodiment of the invention, the shaft 24A turns continuously, the receivers 28A still pass into and through their first or pick-up position and into and through their second or release position.

I claim:

1. Apparatus for use in frying doughnuts, said apparatus including a tank for hot oil, an endless conveyor within said tank and extending lengthwise thereof and including transverse flights, the upper course of said conveyor traveling from a pick-up zone adjacent the rear end of the tank towards the other end thereof with the flights at a level to engage and convey floating doughnuts then to ensure their advance, each two flights defining a space for a transverse series of doughnuts, means midway of the conveyor operable to raise the doughnuts in one space and deposit them other side up in the next adjacent forward space, said means including a transverse shaft in said tank and rotated by said conveyor, diametrically opposed doughnut receivers carried by said shaft and defining an acute angle, each receiver including leading and trailing vanes and having as the shaft turns a first position in which the leading vane is above the trailing vane below the conveyor space next to the shaft on the side thereof towards which the doughnuts advance, the trailing vane passing upwardly through said space, as the shaft turns, to pick up doughnuts therein and carry the picked up doughnuts until they topple forwardly onto the leading vane, other side up, then to be lowered into said next forward conveyor space as said leading vane passes downwardly therethrough into a second receiver position in which the trailing vane is above the last named space.

2. The apparatus of claim 1 in which there are two receivers.

3. The apparatus of claim 1 in which the vanes are of about the same width but the leading vane is shorter than the trailing vane.

* * * * *